Feb. 12, 1929.
I. L. DUNN ET AL
1,701,805
EXPLOSION ARRESTER
Filed Feb. 11, 1927
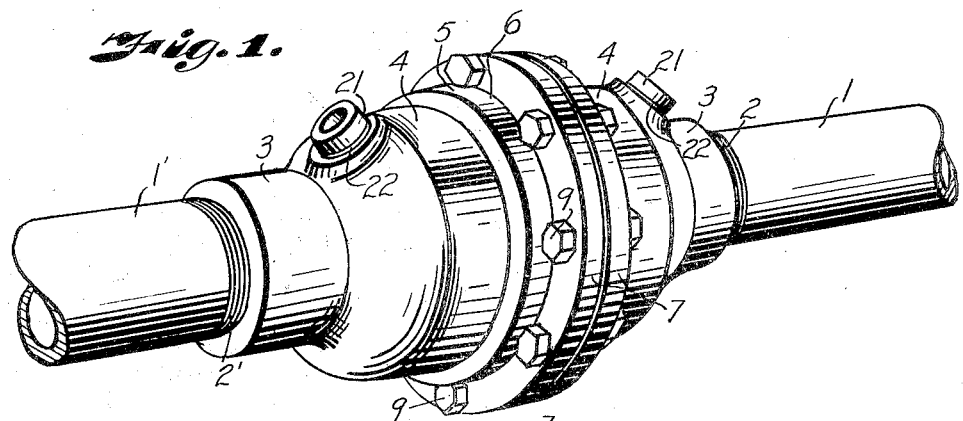
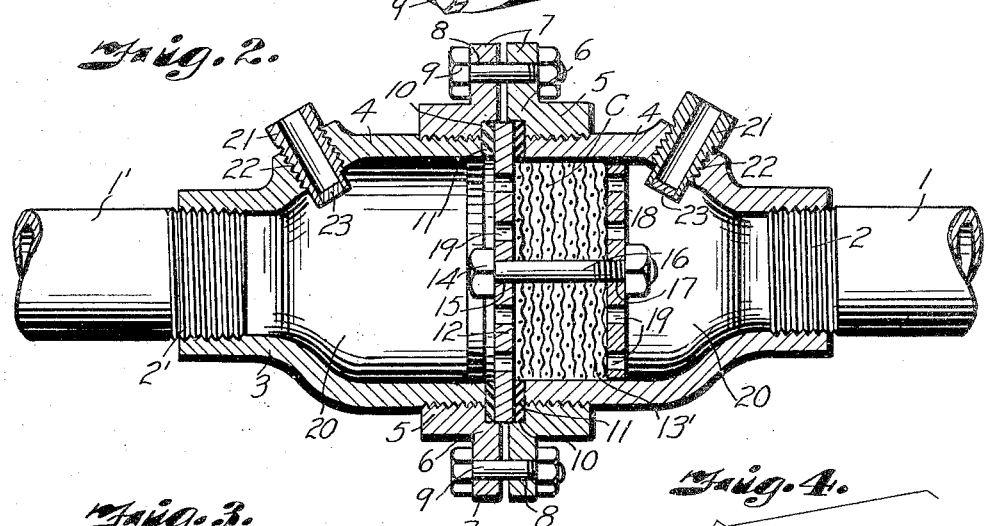
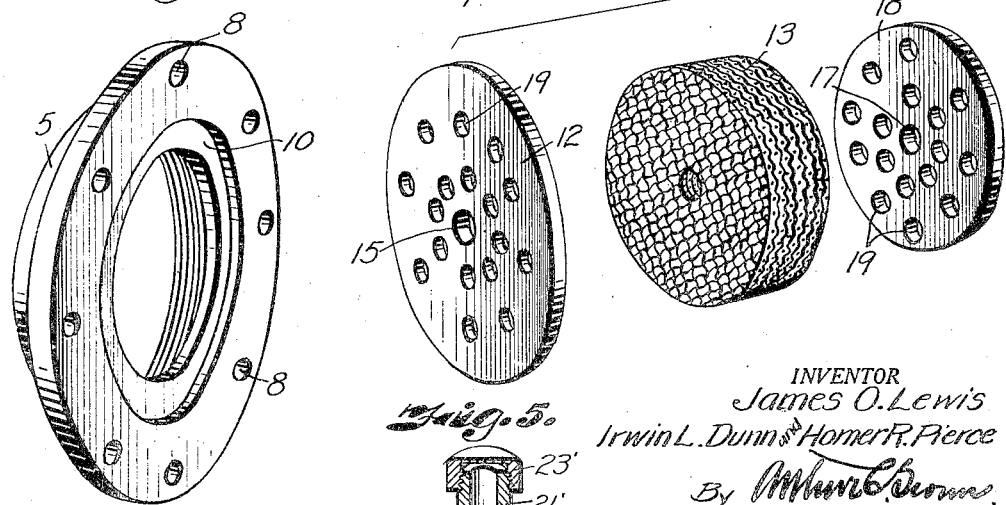
INVENTOR
James O. Lewis
Irwin L. Dunn and Homer R. Pierce
By
ATTORNEY Patented Feb. 12, 1929.

1,701,805

UNITED STATES PATENT OFFICE.

IRWIN L. DUNN, JAMES O. LEWIS, AND HOMER R. PIERCE, OF TULSA, OKLAHOMA.

EXPLOSION ARRESTER.

Application filed February 11, 1927. Serial No. 167,472.

Our invention relates to explosion arresting devices and more particularly to a device of that character for use in flow lines for combustible fluids, and especially adaptable for use in connection with pipe lines for supplying and returning gas-saturated, flow-stimulating air to and from oil sands in a producing field.

It is not uncommon practice in oil fields, wherein the natural rock pressure has been depleted, to supply artificial pressure to the sands through what is commonly termed an air well for increasing flow of oil to producing wells. The air passing through the sands becomes saturated with hydrocarbon components of the petroleum in the sands, constituting it an explosive mixture which, should it become ignited in the flow line, may explode and damage the line and adjacent property. The hydrocarbon components contained in the oil are partially recovered after leaving the producing wells, the residual air content of the mixture being passed back through the compressor and thence to the ground together with air to make up for the losses through the supply lines for reuse, but usually retaining sufficient hydrocarbon content to be inflammable and explosive.

It is the purpose of the present invention to provide means for arresting or preventing explosions in the line, and to effect extinguishment of the flame should the fluid become ignited in the line.

In accomplishing this object we have provided improved details of structure, the preferred forms of which are illustrated in the accompanying drawings, wherein:

Fig. 1 is a perspective view of an explosion arresting device embodying our invention, illustrated in connection with a flow line in which the device is interposed.

Fig. 2 is a central longitudinal section of the parts illustrated in Fig. 1.

Fig. 3 is a detail perspective view of the explosion arresting cartridge.

Fig. 4 is a detail perspective view of the cartridge elements in spaced relation.

Fig. 5 is a sectional view of a modified form of plug.

Referring more in detail to the drawings:

1—1' designates sections of a flow line in which the explosion arresting device is interposed.

The explosion arresting device consists generically of a two-piece fitting 2—2', each member of which is attached to its pipe section by a sleeve 3 and comprises a cylindrical bell 4 integral with the sleeve and having a screw threaded free end for carrying the collar 5 of a clamp member 6. The clamp member comprises an extended flange 7 provided with an annular series of apertures 8 for carrying the tie bolts 9 whereby the two bells are clamped together, each of the clamp members having a shouldered socket 10 at its inner end seating the outer portion of a gasket 11 together with the rim of the mounting disk 12 of the cartridge indicated generally by the letter "C".

The parts just described are duplicated on each of the flow line sections and the interrupter cartridge held securely within the housing by the clamp members 6 and the housing sealed by clamping of the ends of the bells against the gaskets interposed between the bells and the disk 12.

The cartridge whereby flow through the housing is interrupted preferably comprises, in addition to the mounting disk 12, a plurality of wire mesh disks 13' of a diameter corresponding to the interior of the diameter of the housing and compressed to form a reticular plug 13, the disks being arranged irregularly relative to each other to avoid open channels therethrough, but preferably having a combined flow area not less than that of the flow line so that, while flow through the housing is interrupted in that it is not direct from one end of the housing to the other, it is not dammed so as to stop the flow or create excessive back pressure in the line. The plug 13 is attached to the mounting disk 12 by a bolt 14 which extends through a central aperture 15 in disk 12, through a central aperture 16 in the plug 13 and through a central aperture 17 in a keeper disk 18, which latter is of a diameter to snugly fit within the housing, but permit of insertion or removal of the plug. It is apparent that density of the plug may be varied by regulation of the nut on the bolt to vary freedom of flow through the cartridge.

The mounting disk 12 and the keeper disk 18 are provided with apertures 19 in sufficient number and of sufficient size to provide a total flow area not less than that of the flow line so that fluid entering the housing may pass freely, but in irregular channels, through the disks and through the plug.

A plug of the type described may be assembled as a unit and applied to the housing in the field by projecting it into one of the housing bells and then clamping the other bell against the projecting rim of the mounting disk so that the latter is held securely between the ends of the bells and the joint sealed by the gaskets 11.

With a flow line provided with arresting devices such as we have described, should fluid in the line become ignited the flame will travel in both directions to the arresters and will be temporarily stopped at each. Where the flame travels down stream with the flow of the gas, it will be put out at the face of the cartridge because the burnt gas will follow up and extinguish the flame at once, unless the line breaks in between and air-gas flows back from the air wells. Where the gas travels upstream, it will be stopped at the arrester, but very often it will continue to burn in front of the cartridge as the gas is fed in through the cartridge. After a while it will heat up through the cartridge or burn the metallic filling of the cartridge and then start an explosion at the other side.

In order to obviate such explosion we provide means for effecting extinguishment of the flame in the housing. This means preferably comprises a nipple 21 threaded into an opening 22 in the bell 4 and sealed preferably at its inner end with a disk 23 fusible at a temperature sufficiently high to obviate its destruction under normal conditions, but low enough for destruction under the heat generated by burning of fluid in the housing for a short time period. With the device equipped with the relief member, should the fluid become ignited and burned in the chamber of the housing, the fusible disk will melt before the heat of the burning fluid has seriously damaged the housing or interrupter plug and before the pressure has reached a degree to cause an explosion. When the disk melts, the channel through the nipple is opened and contents of the housing chamber, being at much greater than atmospheric pressure will rush through the nipple and snuff out the flame, thereby extinguishing the fire and preventing explosion.

While we have shown and described a specific form of interrupter plug, relief member, and housing, we do not wish to be limited to these specific forms, as modifications may be employed without departing from the scope of the invention, as for illustration, by substituting for the nipple 21 and fusible plug 23 the nipple 21' mounting a fragile cap 23' on its outer end which may be displaced by excessive pressure within the housing generated by the explosion of the combustible mixture in the system.

What we claim and desire to secure by Letters Patent is:—

1. In combination with a fluid flow line, an arresting device interposed in the line comprising bells, forming expansion chambers, an interrupter comprising a reticular cartridge located in one of said chambers and having a mounting member interposed between the ends of the bells, packing between the mounting member and the ends of the bells, clamp rings on the bells, and bolts on the clamp rings for drawing the ends of the bells against the mounting member.

2. In combination with a fluid flow line, an arresting device interposed in the line comprising bells, forming expansion chambers, an interrupter comprising a reticular cartridge located in one of said chambers and having a mounting member interposed between the ends of the bells, packing between the mounting member and the ends of the bells, clamp rings on the bells, bolts on the clamp rings for drawing the ends of the bells against the mounting member, the clamp rings having seats for the mounting member, and packing in said seats and extended between the ends of the bells and said mounting member.

3. A cartridge for the purposes set forth comprising a reticular plug, perforate disks at the ends of the plug, one of the disks being of greater diameter than the plug to constitute it a mounting member.

4. A cartridge for the purposes set forth comprising a reticular plug, comprising a plurality of mesh disks, perforate keeper disks at the ends of the plug, and a bolt extending through the plug and disks to hold the same together.

5. A cartridge for the purposes set forth comprising a reticular plug, comprising a plurality of mesh disks, perforate keeper disks at the ends of the plug, and a bolt extending through the plug and disks to hold the same together, one of the end disks being of greater diameter than the plug to constitute it a mounting member.

6. A cartridge for the purpose set forth including end disks and a plurality of reticular, compressible members located between the disks, and a bolt extending through said end disks and compressible members to retain the same in assembled relation, the bolt being adjustable to vary compression of the compressible members.

In testimony whereof we affix our signatures.

IRWIN L. DUNN.
JAMES O. LEWIS.
HOMER R. PIERCE.